Figure 1:
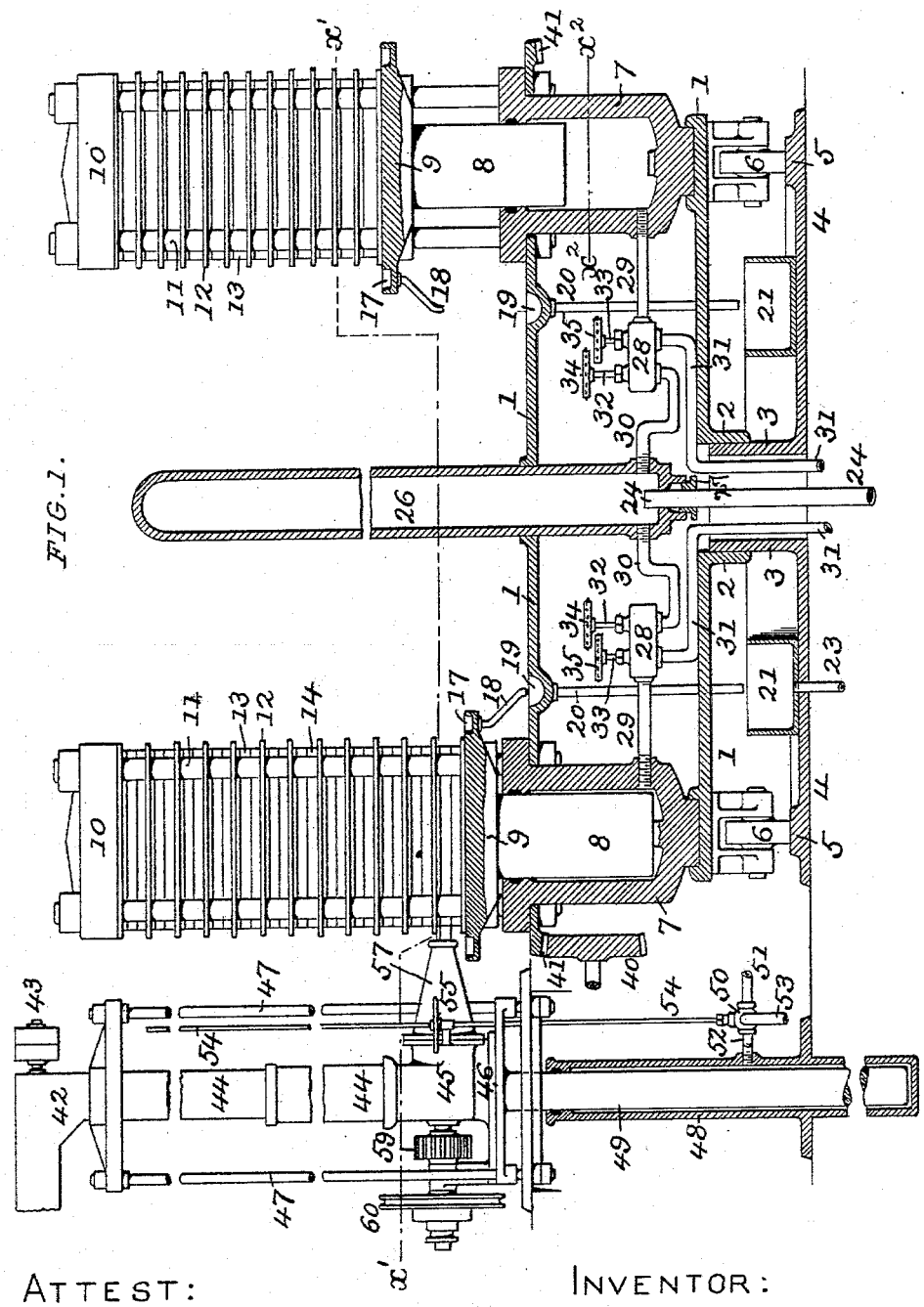

(No Model.) 3 Sheets—Sheet 3.

E. J. O'BRIEN.
APPARATUS FOR SEPARATING FLUIDS FROM SOLIDS.

No. 533,734. Patented Feb. 5, 1895.

Witnesses:
John Enders jr
James Lavallen

Inventor:
Edward J. O'Brien
by Robert Burns
Attorney.

UNITED STATES PATENT OFFICE.

EDWARD J. O'BRIEN, OF LITTLE ROCK, ARKANSAS.

APPARATUS FOR SEPARATING FLUIDS FROM SOLIDS.

SPECIFICATION forming part of Letters Patent No. 533,734, dated February 5, 1895.

Application filed September 23, 1893. Serial No. 486,315. (No model.)

*To all whom it may concern:*

Be it known that I, EDWARD J. O'BRIEN, a citizen of the United States, residing at Little Rock, in the county of Pulaski and State of Arkansas, have invented certain Improvements in Apparatus for Separating Fluids from Solids; and I do hereby declare the following to be a full, clear, and exact description of the same, reference being had to the accompanying drawings, forming a part thereof.

The present invention relates to an apparatus for separating by pressure, fluid from solid bodies, and which is more especially adapted to the extraction of oils from seeds, such as cotton seed for example.

Various objects of my present invention are as follows:

First. To provide an improved apparatus by which the continuous separation of fluids from solids is effected, and in which constantly succeeding batches of the material to be acted on, are submitted to a separating compression within an endless train or series of molds, or filter platens, the pressure being continuous, and exerted at one and the same time upon a majority of the train of molds or filter platens; the portion of such train or series of molds that is successively exempted from pressure consisting of the individual molds or filter platens that have reached the point in their travel, at which they are opened for the removal of the solid material left after the removal of the fluids therefrom; as well as the individual molds or platens, that are being charged with fresh or raw material, the filling, expressing and emptying operations being continuous, the one taking place upon the mold train or series, while the others are taking place upon other portions thereof, and each individual mold or filter platen passes in rotation through the different operations of filling, expressing, and emptying.

Second. To provide an automatically operating press mechanism or construction in which an endless train or series of individual molds or pressing devices, are brought successively to a charging point to be filled with loose raw material, after which pressure is applied in a continuous manner during the movement of such endless train of molds toward the point at which the molds are successively emptied and again refilled for another pressing; the interval of time involved in such travel of the molds under compression being sufficient to admit of the thorough expression of the oil or other liquid from the material undergoing treatment.

Third. To provide an improved press mechanism, in which the operation of the press parts is rendered easy and convenient of control by the operator; the feeding or charging of the molds, effected in a simple, convenient and ready manner; and the expressed oil or other fluid, collected from the different individual molds or filter platens and conducted away from the press.

I attain such objects by the mechanism illustrated in the accompanying drawings, in which—

Figure 2:
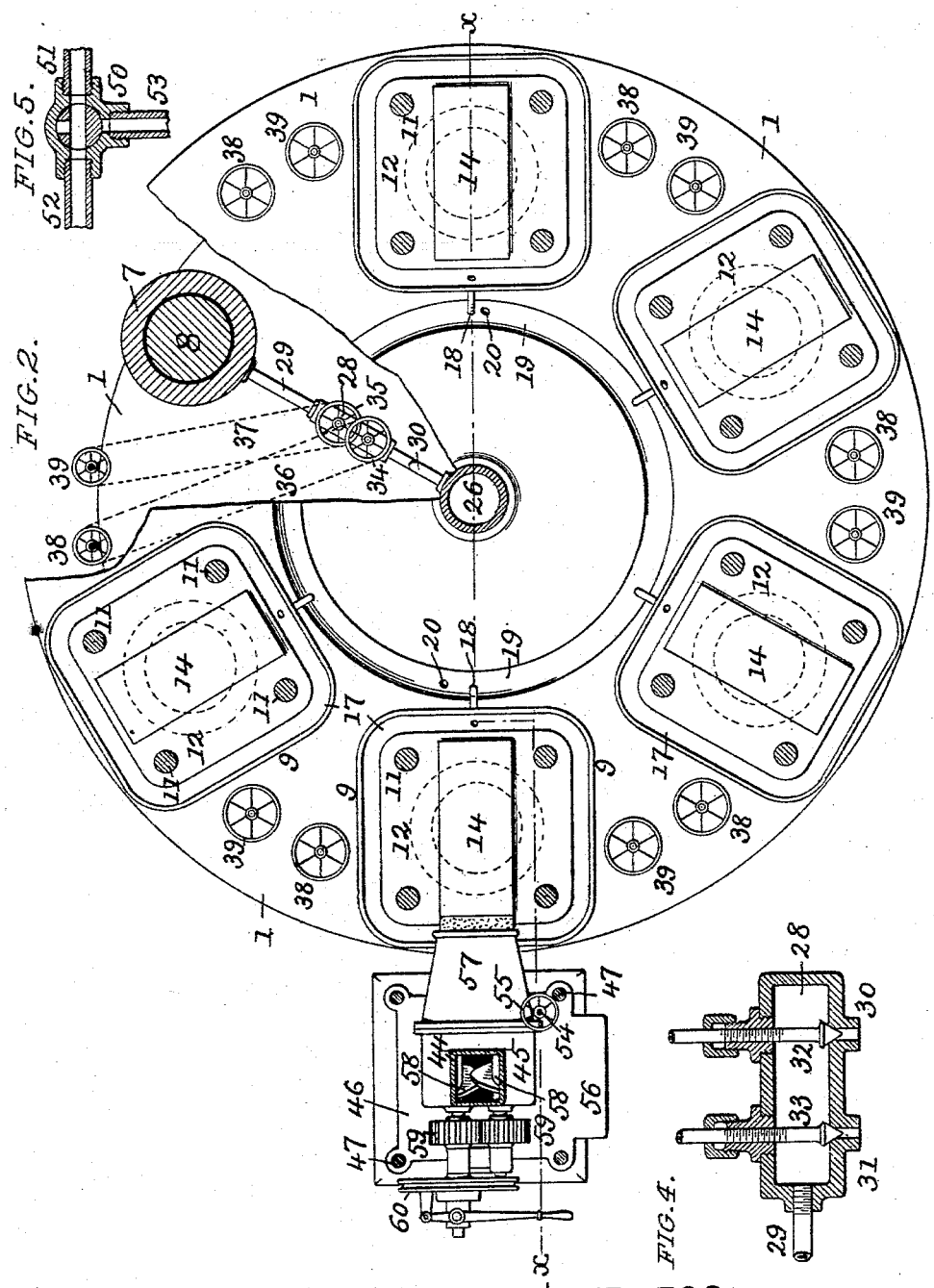
Figure 3:
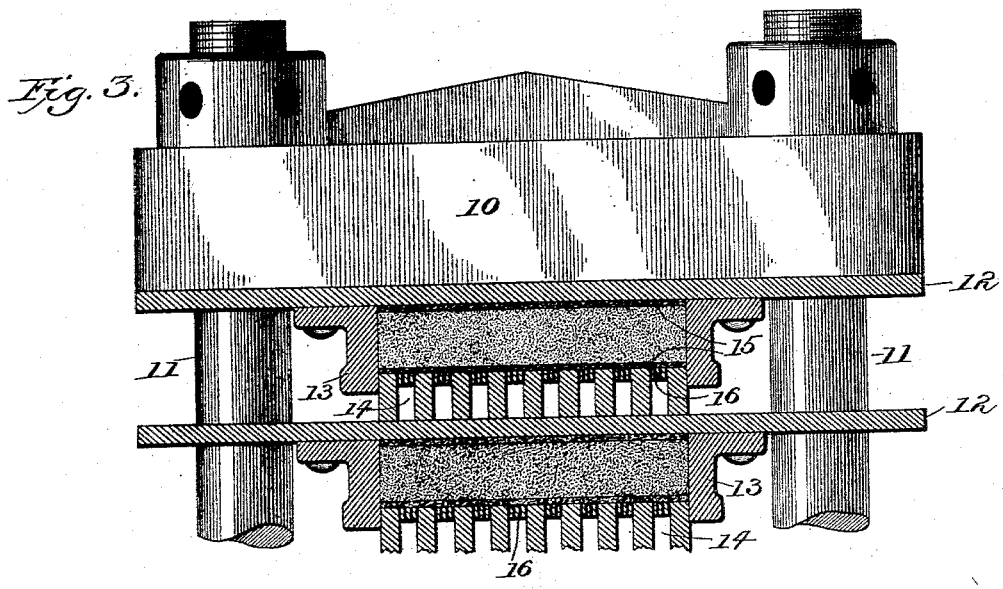
Figure 6:
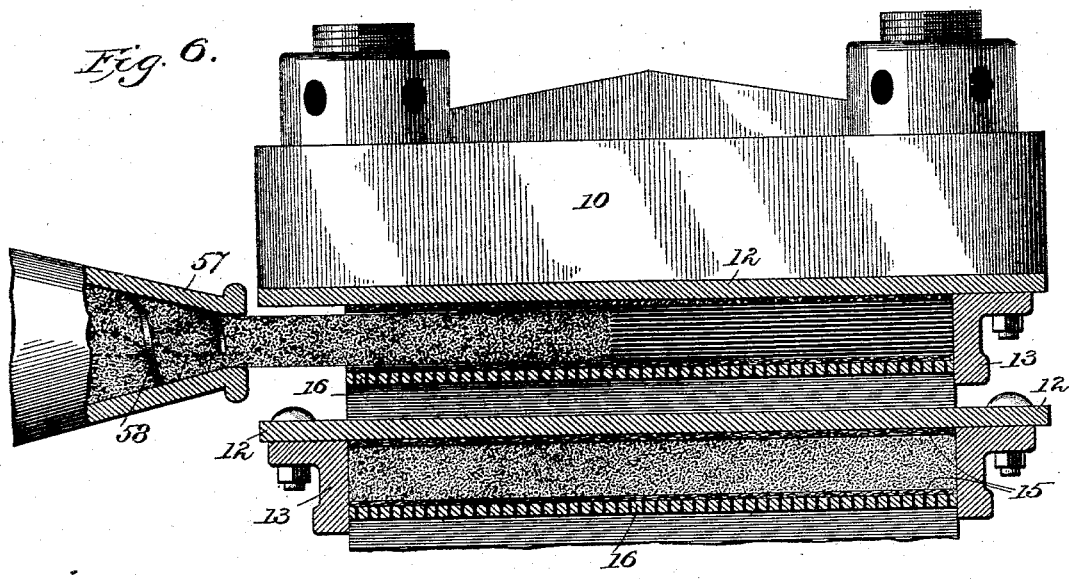

Figure 1, is a longitudinal section at line $x$—$x$, Fig. 2, of a hydraulic press constructed in accordance with my present invention; Fig. 2, a sectional plan of the same on lines $x'$—$x'$, and $x^2$—$x^2$ of Fig. 1; Fig. 3, an enlarged detail transverse section of the press molds, illustrating an ordinary construction adapted to the extraction of oils from seeds; Fig. 4, an enlarged detail sectional elevation of the valve chest and the inlet and outlet valves for the hydraulic pressure cylinders; Fig. 5, an enlarged detail section of the valve controlling the water inlet and outlet to the hydraulic cylinder and ram for raising the press charger; Fig. 6, an enlarged detail longitudinal section on line $x^3$—$x^3$, Fig. 3.

Similar numerals of reference indicate like parts in the different views.

The apparatus used in the expression of liquid from solid matter, in the present improvement, and as illustrated in the accompanying drawings, will consist essentially of a stationary mold filling or charging apparatus, under the control of the operator, and a movable endless train or series of molds adapted to be successively charged with material, then submitted to pressure that is maintained for a predetermined period, during the travel of each individual mold, and which period of pressure is sufficient to enable the perfect separation or extraction of the liquid from the solid portions of the material operated upon; at the termination of which period the pressure is relieved, the molds opened, the dry cake or residuum of solid material removed, leaving the particular pressure mechanism and mold empty and ready for a recharging or refilling with raw material.

The form and special construction of the molds, may be of any of the usual types, that may be found best suited to the particular material undergoing treatment.

In the construction shown in the drawings, 1 represents a revoluble table, journaled at its center in any suitable manner, preferably by means of an annular downward flange 2 embracing an annular upturned flange 3 on the base or track plate 4, the outer periphery of which is formed with a circular or endless track 5 for the bearing rollers 6, by which the outer periphery of the revoluble table 1 is carried and supported in a proper horizontal plane.

Upon the table 1, are arranged in concentric series, the hydraulic cylinders 7 of the train or series of independent press mechanisms, the ram 8 of each cylinder carrying the lower movable press platen or follower 9, while the upper and stationary press platen or head 10 is attached by the usual vertical posts or bolts 11 to the ram cylinder 7, in any usual and well known manner.

In the construction shown in the drawings the molds will be of the ordinary multiple construction, and will consist of the series of superimposed plates or platens 12, the bottoms of which are provided with dependent flanges 13 to form a series or vertical tiers of receiving chambers for the material, while the top of each plate or platen is provided with a grid follower 14 that fits within said chamber, so as to have a vertical movement within the same, see more particularly Fig. 3, the grid formation of such follower being to allow for the free out flow of the oil or other fluid as it exudes from the material under pressure. The usual facings 15 of cloth or other textile material and the perforated metal backing 16 will be placed upon the top surface of the follower 14, as well as other portions of the pressure chamber, in the usual manner.

The front and rear ends of the mold cavities will be formed in the same manner as the sides, by means of dependent plates or flanges 13 that are removably attached to the plates or platens 12, in order that they may be capable of removal in charging and discharging the mold cavities.

17, is a marginal trough, preferably of an annular shape, formed on the lower movable platen or follower 9, and in which the oil or other liquid as it exudes from the vertical series of molds or pressure chambers, collects, and from which such liquid material drips through pipe 18, down into an annular trough or channel 19 in the revoluble press table 1, and from such channel through pipe 20 into the stationary annular trough 21, secured to the stationary base 4 of the apparatus, which forms a collecting receiver for such liquid material, which can be removed at suitable intervals through the discharge pipe 23 communicating with a storage tank or other receiver. In some cases the drip pipes 18 may descend through the table 1, and discharge directly into the stationary annular receiving trough 21, and the annular trough 19 and pipes 20 dispensed with, without departing from the spirit of this part of my invention.

In the present apparatus, the water pressure by which the press mechanisms are actuated, is introduced by the inlet pipe 24 from the hydraulic pump or other source of pressure supply, into a stand pipe or accumulator 26, that is attached to and rotates with the revoluble press table 1; connection between said revoluble stand pipe and the stationary inlet pipe 24, being effected by a stuffing box or gland 27, so as to admit of the rotation of the one upon the other.

The different hydraulic press cylinders 7, have communication through their valve chests 28, and pipe connections 29, 30, with the lower portion of the stand pipe or accumulator 26, that constitutes a supply trunk common to the whole series of valve chests; and with a suitable waste water receiver by pipe connection 31.

The valve chamber or chest 28, is of a box formation, as shown, with the pipe connections 30 and 31 connecting with the bottom thereof, the openings forming seats for the respective inlet and outlet valves 32, 33, by which the inlet and outlet of water to the ram cylinder are regulated and controlled; the pipe connections 29 between the valve chest and the hydraulic or ram cylinder being in constant communication.

The valves 32, 33, are provided with chain or other wheels 34, 35, around which pass endless chains or ropes 36, 37, that in turn pass around similar chain or other wheels on the shafts of the operating hand wheels 38, 39, journaled in a convenient location near the outer periphery or rim of the press table 1.

Each individual hydraulic cylinder of the train or series will be provided with its separate and individual valve mechanism and connections, so that each press mechanism is subject to separate and independent control by the operator.

An intermittent circular movement is communicated to the revoluble press table 1 by any usual mechanism, such for instance, as a bevel pinion 40 gearing with a circular rack 41 formed on the table; the driving pinion 40 being controlled in its motion by a suitable clutch, under control of the operator, so that the desired amount of circular movement can from time to time, be imparted to the table 1, and the train or series of press mechanism carried thereon.

No novelty is claimed in the present invention for the means whereby such intermittent or step by step motion in a circular path is imparted to the table 1, and consequently any well known and suitable mechanism may be employed in connection with the present improved apparatus without departing from the spirit of the present invention.

In the present improved apparatus, the feeding or charging mechanism by which the vertical tier or series of pressure chambers of the train of press mechanisms, are charged with fresh or raw material consists as follows:

42, is a hopper receiving the raw material, as for instance the crushed and heated seeds, as they come from the usual seed heaters generally employed in oil extracting purposes; 43 being the driving shaft of an endless conveyer by which the material is drawn into the hopper.

44, is a vertical trunk connecting the bottom of the hopper 42 with the charger chamber 45, and said trunk is made in telescopic sections, as shown, that slide one upon the other to admit of a rising and falling movement of the charger 45, in the operation of filling the vertical tier or series of pressure chambers of the press.

The charger chamber 45, is mounted upon a platform 46, arranged to slide vertically on the vertical rods 47 of a stationary guide frame that supports at its upper end the hopper 42. Vertical movement is imparted to the platform 46 and the charger chamber 45 thereon, by means of a hydraulic cylinder 48, the piston or plunger 49 of which is attached to the under side of the platform 46, as shown.

The valve 50 by which the ingress and egress of water to the cylinder 48 are controlled, is of the three way type, and has connection by branch 51 with the water supply, by branch 52 with the cylinder 48, and by branch 53 with the waste water receiver. The stem 54 extends up vertically the height of the guide frame, and is of a splined or non-circular form, so as to have operative engagement with an operating hand wheel 55, journaled at the side of the charger chamber 45, or any other supporting part of the platform 46 the construction being such that the operating hand wheel will be free to slide in a vertical direction in unison with the vertical movements of the press charger, but the two will move together in a rotary direction when the hand wheel is operated. By this means the valve 50 can be operated from the platform 46, and for this purpose the same is widened laterally at one side to form a standing place 56 for the operator.

The charger as illustrated in the drawings, consists of a horizontally arranged casing provided at the end adjacent to the mold table 1 with an extension nozzle 57 through which the material is forced in the form of a flat cake into the respective pressure chambers of the press mechanism, the mechanism by which such discharge may be effected being a pair of endless twin screws 58, geared together by gearing 59 and driven by a pulley 60 that has driving belt connection with a corresponding pulley on a suitable driving shaft.

In use the charging of the vertical series of pressure chambers, of the individual press mechanism being charged, will be commenced at the top of the series, and the charger lowered from chamber to chamber, until the whole series are filled; and such lowering is very readily and accurately controlled by means of the hand wheel 55 and rod connections to the valve 50 of the hydraulic cylinder 48.

It is within the province of the present invention to employ mechanical means instead of hydraulic means for lowering and raising the charger, such for instance, as a screw and nut, or a rack and pinion, both of which are well known mechanical expedients for attaining a rectilinear reciprocation of a machine piece or part. In like manner other means than the endless screw can be employed to force the material out of the charger and into the pressure chambers, as for instance, a reciprocating plunger working within the casing of the charger. Similarly a screw or other equivalent power may be employed to furnish the desired pressure instead of the hydraulic rams and cylinders 8 and 7.

The operation of the present improved apparatus, taking for example the extraction of oil from cotton or linseed is as follows: The crushed and heated seeds coming from the heater are received in the hopper 42 and fed therefrom into the charger 45, which at the commencement of the charging operation is at its elevated position in line with the uppermost pressure chamber of the press mechanism, that is next adjacent to the charger and in an open and empty condition ready to be charged with raw material. With the filling of the first or uppermost pressure chamber, the charger is lowered to the next adjacent pressure chamber, by the manipulation of the hand wheel 55, valve stem 54 and valve 50, to allow the escape of the proper amount of water from the hydraulic cylinder 48 and the corresponding descent of the plunger 49 and platform 46. After such second pressure chamber is charged, the charger is again lowered in a similar manner, and so on successively until the entire vertical series of pressure chambers are charged. The main table 1 is then shifted around circularly by means of the pinion 40 and circular rack 41, to bring the next succeeding one of the series or train of pressing mechanisms in line with the charger to be filled. In the interim, the charger will be lifted back to its original elevated position by the manipulation of the valve 50, to admit the necessary water pressure into the hydraulic cylinder 48, to effect such raising of the plunger 49, platform 46 and charger mechanism. At the same time the press mechanism that has been just filled, has pressure applied by the opening of the valve 32 through chain and chain wheels 36, 34, and hand wheel 38, to admit water pressure from the stand pipe 26 into the ram cylinder 7, and such pressure connection will be maintained during the intermittent circular travel of the series or train of press mechanism until it has reached the discharging point next adjacent to charging point, when the pressure upon the ram is relieved by the closing of the valve 32 and opening of the valve 33, through chain and chain wheels 37 and 35, and hand wheel 39 to allow the escape of the water from the ram cylinder 7, a descent of the ram, and an opening of the pressure chambers so that the cakes of solid material contained therein, and from which the oil has been expressed, can be removed by hand preparatory to a recharging with fresh material, as above described.

Each individual press mechanism is successively filled in the manner above described, then put under pressure, and finally emptied, so that the separate and distinct operations of charging, pressing and emptying will take place continuously, and with a train of six pressing mechanisms, as illustrated in the drawings, four of such series will be under pressure at one and the same time, while the other two will be undergoing the emptying and charging operations, respectively. By this means a continuous action of oil extraction will take place, in a very rapid manner, in which all loss of time or delay is entirely avoided, and a minimum amount of labor required to effect the practical and successful working of the present apparatus.

Having thus fully described my said invention, what I claim as new, and desire to secure by Letters Patent, is—

1. The combination of a rotating series of individual press mechanisms, and means for actuating said mechanisms, said means traveling in harmony with the press mechanisms.

2. The combination of a revoluble series of individual press mechanisms, means for imparting revoluble motion to the same, and autonomous means for actuating the press mechanisms, and traveling in harmony therewith.

3. The combination of a revoluble series of individual press mechanisms, a central pressure supply trunk revoluble with the press mechanisms, a series of controlling valves having connection with the press cylinders, and with the central trunk, and an axially arranged inlet pipe connected to the said trunk by a suitable gland, substantially as set forth.

4. The combination of the revoluble table carrying a series of hydraulic press mechanisms, a central stand-pipe or accumulator attached to and turning with said table, and having valved connections with the cylinders of the press mechanisms, and an axially arranged inlet pipe connected to the standpipe by a suitable gland, substantially as set forth.

5. The combination of the revoluble table, carrying a series of hydraulic press mechanisms, a central stand-pipe or accumulator attached to and turning with said table, independent valve and pipe connections between the stand-pipe and the cylinders of the series of press mechanisms, and an axially arranged pipe connected to the stand-pipe by a suitable gland, substantially as set forth.

6. The combination of the revoluble table carrying a series of hydraulic press mechanisms, a central stand-pipe or accumulator attached to and turning with said table, independent valve and pipe connections between the press cylinder and the stand-pipe, and valve operating mechanism extending to the periphery of the table, substantially as set forth.

7. The combination of the revoluble table carrying a series of hydraulic press mechanisms, the lower movable platens of which are formed with marginal receiving troughs, and a stationary annular pan concentrically arranged, and adapted to receive the contents of the marginal receiving troughs of the press platens, substantially as set forth.

8. The combination of a revoluble table, carrying a series of hydraulic press mechanisms, the lower movable platens of which are formed with marginal receiving troughs, outlet pipes therefrom, the revoluble table provided with an annular receiving channel, outlet pipe therefrom, and a stationary annular pan concentrically arranged and adapted to receive and collect the contents of the different marginal receiving troughs of the press platens, substantially as set forth.

9. The combination of a revoluble table carrying an endless series of independent press mechanisms, having vertical tiers of pressure mold chambers, and a charger made adjustable vertically so as to be brought successively into connection with the different pressure chambers, substantially as set forth.

10. The combination of a revoluble series of independent press mechanisms having vertical tiers of pressure mold chambers, a vertically moving charger adapted to successively charge the different mold chambers, and a hydraulic cylinder and piston for effecting the vertical adjustment of the charger substantially as set forth.

11. The combination of a revoluble series of independent press mechanisms, having vertical tiers of pressure mold chambers, a vertically moving charger, adapted to successively charge the different mold chambers, a stationary supply hopper, a vertical telescopic trunk connecting such hopper and charger, and means for effecting the vertical adjustment of the charger, substantially as set forth.

12. In a charger mechanism for vertical tier mold or pressure chambers, the charger mechanism arranged to slide vertically, a hydraulic piston and cylinder for effecting the vertical adjustment of the same, and an operating valve for the same, the stem of which has a sliding operative connection with an operating hand wheel carried on the platform of the vertically moving charger, substantially as set forth.

In testimony whereof I affix my signature in presence of two witnesses.

EDWARD J. O'BRIEN.

Witnesses:
ROBERT BURNS,
JAMES LAVALLIN.